United States Patent [19]

Fukami et al.

[11] Patent Number: 4,734,795
[45] Date of Patent: Mar. 29, 1988

[54] APPARATUS FOR REPRODUCING AUDIO SIGNAL

[75] Inventors: Takashi Fukami; Akira Sakamoto; Masataka Yoritate, all of Tokyo, Japan

[73] Assignee: Sony Corporation, Tokyo, Japan

[21] Appl. No.: 734,263

[22] PCT Filed: Sep. 10, 1984

[86] PCT No.: PCT/JP84/00433
§ 371 Date: May 9, 1985
§ 102(e) Date: May 9, 1985

[87] PCT Pub. No.: WO85/01377
PCT Pub. Date: Mar. 28, 1985

[30] Foreign Application Priority Data

Sep. 9, 1983 [JP] Japan .................... 58-166269
Dec. 14, 1983 [JP] Japan .................... 58-234171

[51] Int. Cl.⁴ ..................... G11B 5/00; G11B 5/08
[52] U.S. Cl. ............................... 360/8; 360/32
[58] Field of Search ................ 360/8, 32, 51; 369/60

[56] References Cited
U.S. PATENT DOCUMENTS 3,860,760  1/1975  Rittenback .................... 360/8
3,975,763  8/1976  Kitamura ...................... 360/8

Primary Examiner—Vincent P. Canney
Attorney, Agent, or Firm—Lewis H. Eslinger

[57] ABSTRACT

An audio signal reproducing apparatus includes a player unit (10) and a pitch conversion unit (20). The player unit (10) reproduces, at variable speed, audio signal data from a recording medium (11) on which the audio signal data has been recorded at a predetermined sampling frequency Fs. The pitch conversion unit (20) writes into a memory the reproduced audio signal data obtained by the player unit (10) by means of a write clock which corresponds to a reproduction sampling frequency fs and reads out the reproduced audio signal data from the memory by means of a read clock which corresponds to an oscillation frequency fp from an oscillator which oscillates at a predetermined sampling frequency Fs, thereby effecting pitch conversion processing with respect to the reproduced audio signal. The pitch conversion unit (20) is composed of a pitch conversion processor section (21) which effects pitch conversion processing with respect to the reproduced audio signal at any desired pitch conversion ratio, and a pitch ratio control section (22) which automatically sets the pitch conversion ratio in relation to the pitch conversion processor section to a predetermined value by means of a signal representing the start or end point of the reproduced audio signal.

6 Claims, 8 Drawing Figures

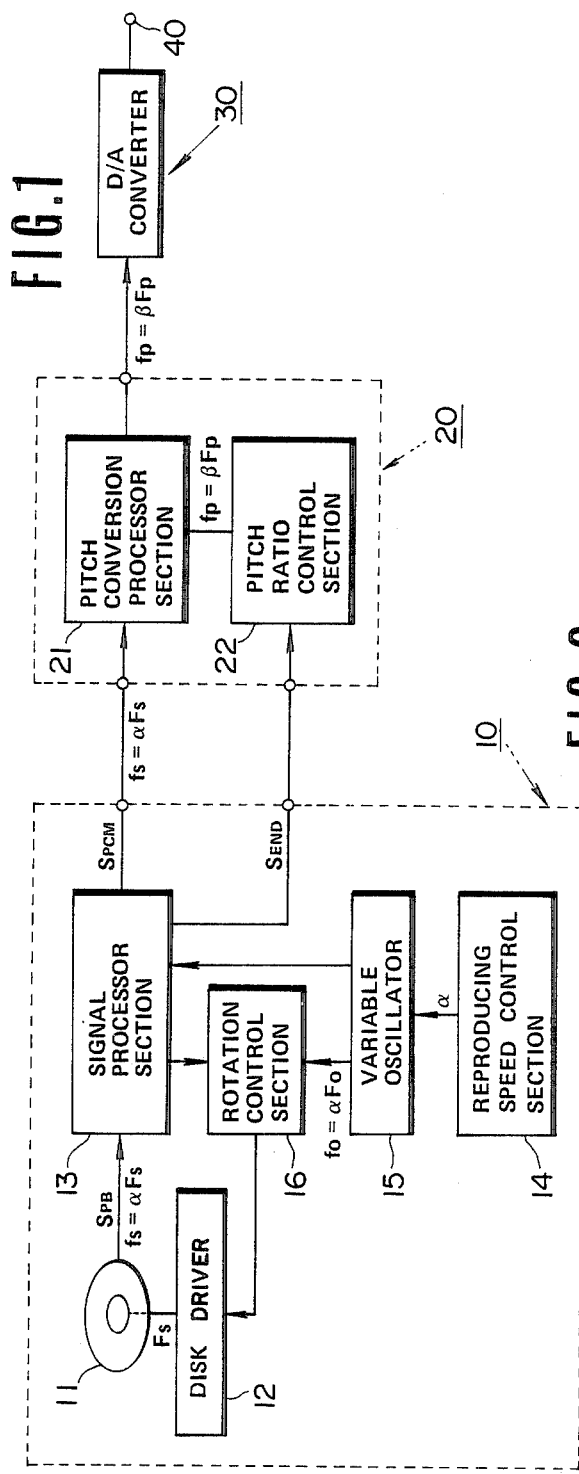
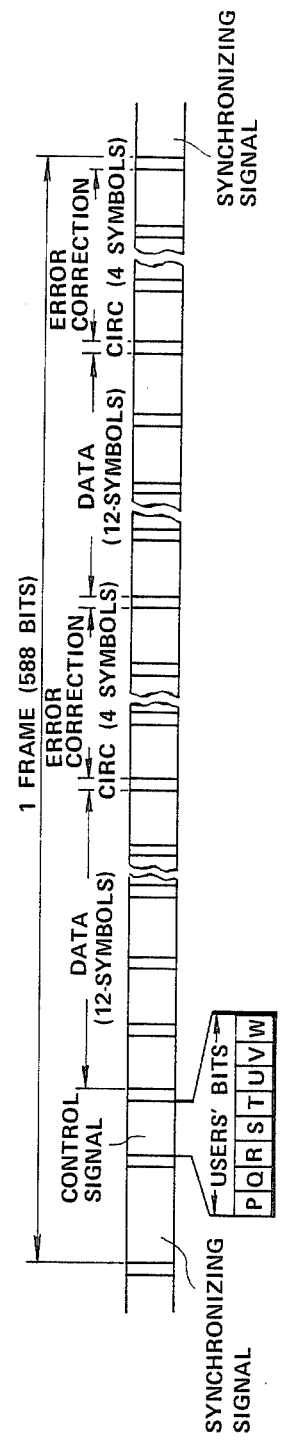

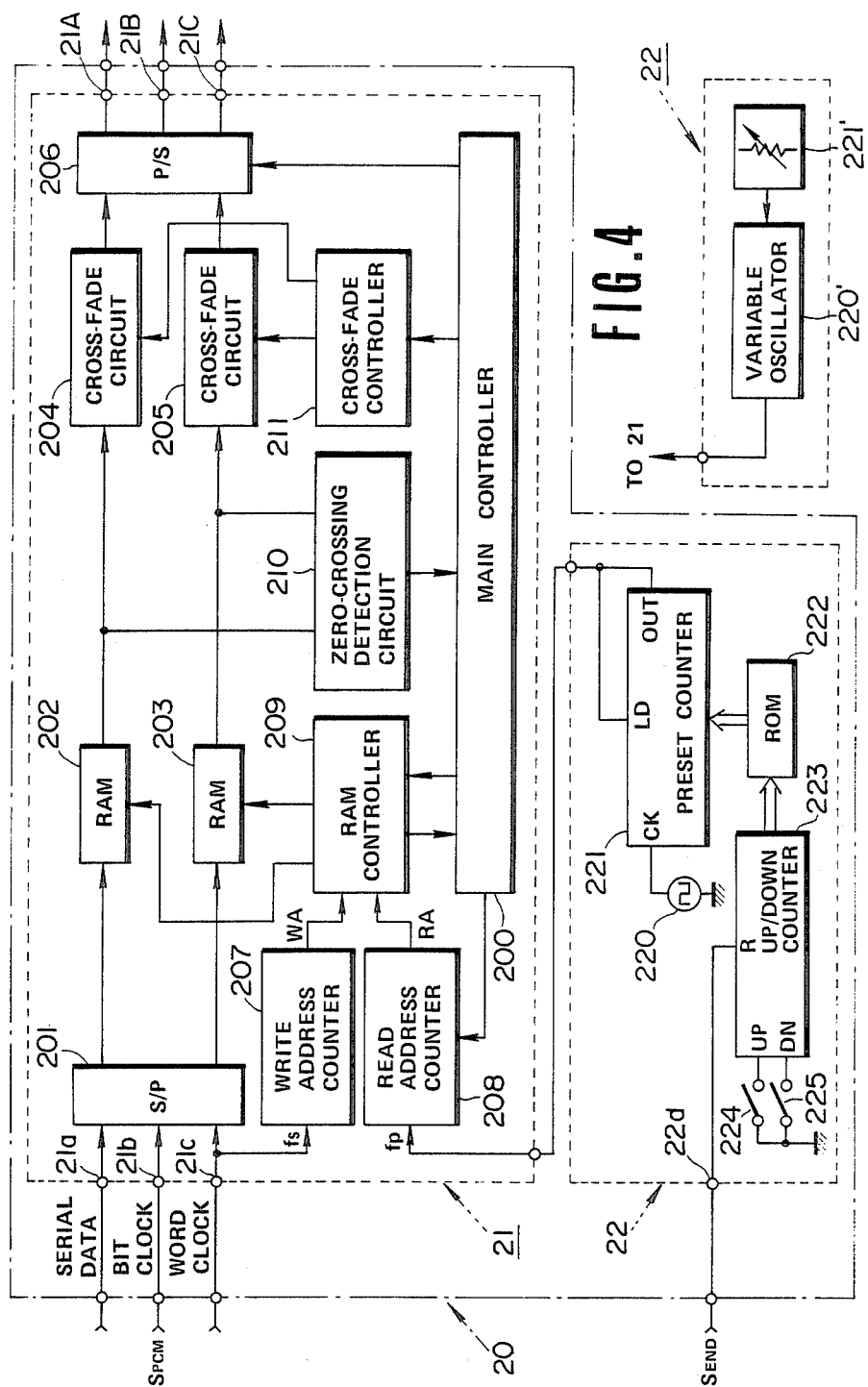
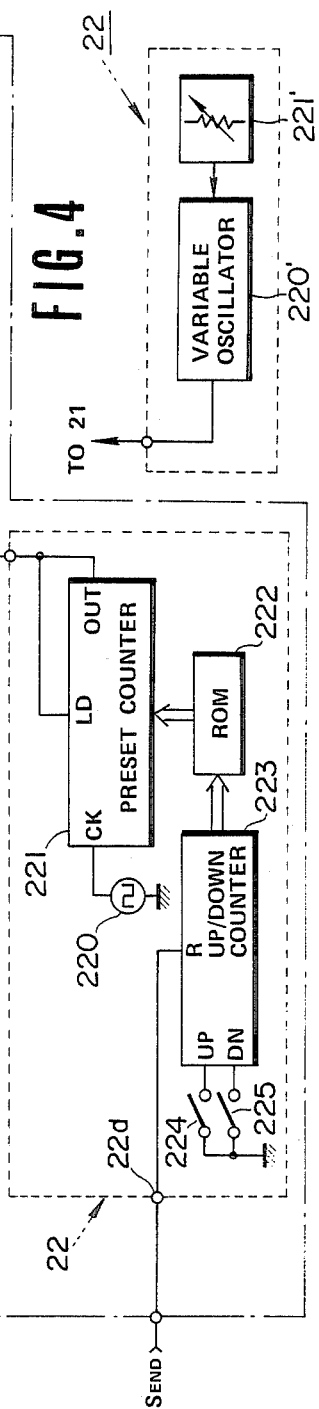

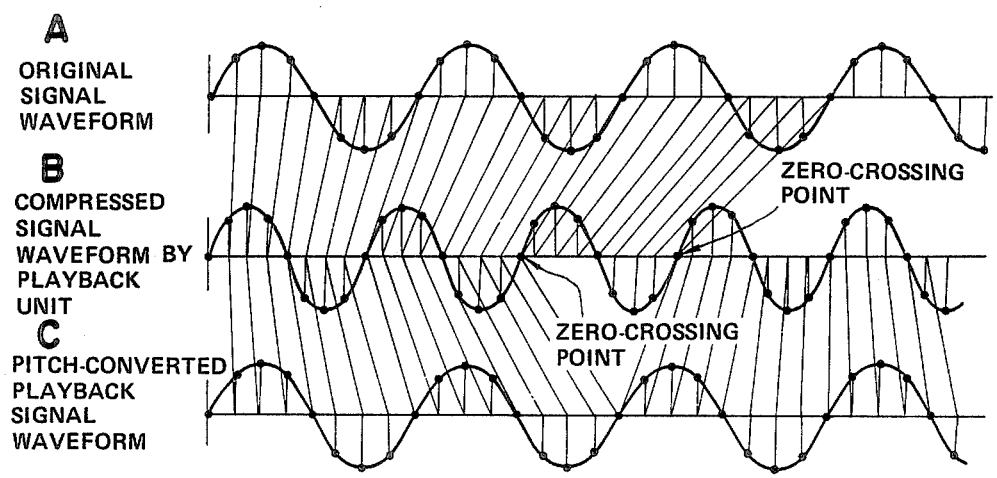
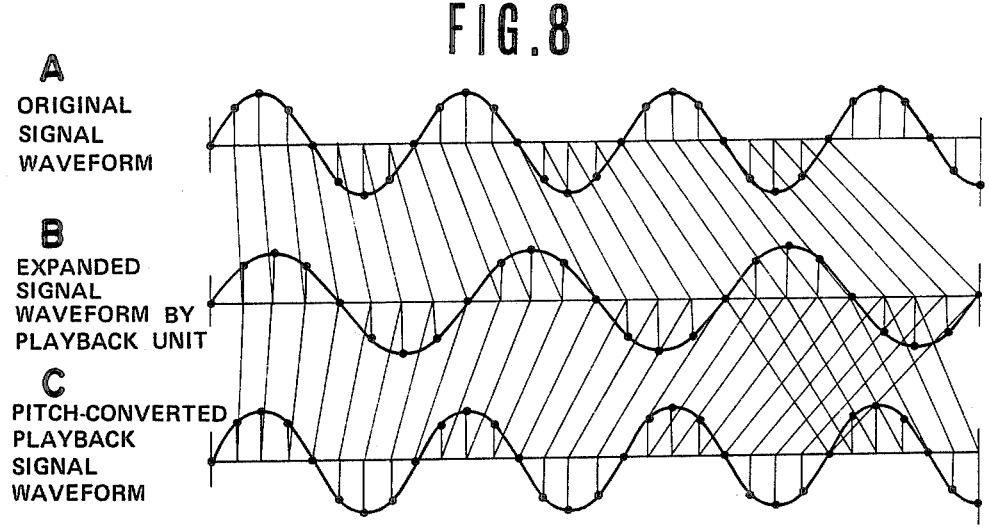

APPARATUS FOR REPRODUCING AUDIO SIGNAL

TECHNICAL FIELD

This invention relates to an apparatus for reproducing audio signal which is digitally processed from the recording medium and, more particularly, to such apparatus for reproducing an audio signal in which the reproducing speed and the sound pitch (key) may be variably controlled independently of each other. The invention also relates to an apparatus for reproducing audio signal for used with a player system adapted for reproduction of for example a performance of the background orchestra without the singer's voice previously recorded on the recording medium.

BACKGROUND ART

In the signal reproducing apparatus such as the commonplace audio tape recorder or disk player, it is well-known that, when the reproducing speed, i.e. the speed at which audio signals recorded on a recording medium are reproduced, is changed with respect to the recording speed, i.e. the speed at which the audio signals are previously recorded on the recording medium, not only the reproducing speed or tempo but also the sound pitch or key is changed. That is, the higher the reproducing speed, the higher the sound pitch and, conversely, the slower the reproducing speed, the lower sound pitch.

In the apparatus for reproducing audio signal such as a performance of the background orchestra without the singer's voice, there are presented in the art various audio signal reproducing apparatus which is provided with such a reproducing function that the tempo or reproducing speed may be variably and arbitrarily set so that a performance of the background orchestra without the singer's voice may be reproduced at the tempo desired by the singer. In the signal reproducing apparatus provided with such variable speed reproducing function, the sound pitch or key is necessarily changed with changes in the reproducing speed. By this reason, a signal processing device provided with the function of changing the pitch or key of the reproduced audio signals is used for effecting a pitch conversion in such a manner that the pitch or key of the reproduced audio signals is not changed even though the reproducing speed is changed so that the reproduced audio signals may have approximately the same pitch as that used during the original recording.

The above mentioned signal processing apparatus are known in the art in which analog delay elements such as BBDs (bucket brigade devices) or CCDs (charge coupled devices) are used and the read or write clocks thereof are chronologically changed for controlling the delay time, or in which input audio signals are converted into digital signals and digital delay elements such as shift registers or RAMs (random access memories) are used for effecting time base compression and expansion through control of the writing and read-out operations.

The conventional type of the audio signal reproducing apparatus is constructed in the following manner. That is, with the tape recorder or the disk player, the running speed of the recording medium such as the magnetic tape or the disk (tape speed or rotating speed) is controlled by the reproducing speed control device so that the reproduced audio signals are reproduced from the variable speed reproducing apparatus and converted in pitch in the pitch conversion unit supplied at the signal output terminals. Information signals indicating changes in the reproducing speed are supplied from the reproducing speed control unit to the pitch conversion unit, which then performs a pitch conversion so that the sound pitch of the reproduced audio signal is lowered to 1/m times the standard sound pitch when the variable speed reproducing unit is operating at a speed m times the standard speed.

In the above described type of conventional audio signal reproducing apparatus for processing the pitch conversion of the reproduced audio signal, there is required an information indicating the ratio of the change caused in the reproducing speed. In addition, the variable speed reproducing unit and the variable speed control unit need to be controlled at all times under a predetermined relation to each other. Thus it is not feasible to variably independently control the tempo and the key of the reproduced audio signals.

In a reproduction of a performance of the background orchestra without the singer's voice many tunes are selectively reproduced, and the singers usually take their turns by rotation. With the audio signal reproducing apparatus used for reproducing a performance of the background orchestra without the singer's voice, the pitch conversion unit operates in the previous setting even when the tunes and/or the singers are changed, thus embarassing the singers.

DISCLOSURE OF THE INVENTION

In consideration of the above described prior art audio signal reproducing apparatus, the present invention provides a novel type apparatus for reproducing audio signal which through the combination of the digital signal reproducing unit and the pitch conversion unit is able to variably independently control the reproducing speed and the sound pitch of the reproduced audio signals.

The present invention also provides an apparatus for reproducing audio signal in which the pitch conversion ratio can be automatically set to a predetermined value for each tune of the reproduced audio signals reproduced by the audio signal reproducing unit for improving the operability of the audio signal reproducing system adapted for a reproduction of the background orchestra without the singer's voice; reproduction and the like.

BRIEF DESCRIPTION OF THE DRAWINGS

FIG. 1 is a block circuit diagram showing an embodiment of the apparatus for reproducing audio signal according to the present invention which is applied to the compact disk player. FIG. 2 is a schematic diagram showing the recording format of the compact disk of the above embodiment.

FIG. 3 is a block circuit diagram showing a concrete constructional example of the apparatus for reproducing audio signal of the above embodiment; FIG. 4 is a block circuit diagram showing a modification of the pitch ratio control unit in the circuit of FIG. 3; FIGS. 7 and 8 each consisting of a, b and c are waveform diagrams showing the operation of the apparatus for reproducing audio signal.

BEST MODE FOR EXECUTING THE INVENTION

Figure 5:
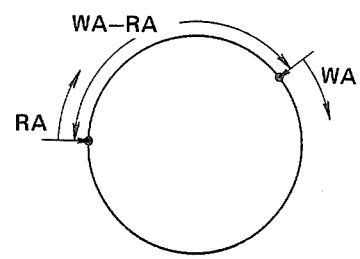
FIG. 5 is a schematic diagram showing the changing state of the RAM addresses in the above apparatus for reproducing audio signal.

An embodiment of the audio signal reproducing apparatus according to the present invention is hereafter explained by referring to the accompanying drawings.

The whole construction of the apparatus, in which the present invention is applied to a so-called compact disk player, is shown in the block circuit diagram of FIG. 1. The apparatus comprised of player unit 10 by which the audio signal data with a predetermined sampling frequency Fs recorded on a compact disk 11 along with control data are reproduced with a variable speed; a pitch conversion unit 20 by which the reproduced audio signal data from the player unit 10 are subjected to a pitch conversion process; and a digital to analog (D/A) converter 30 by which analog reproduced audio signals are formed from reproduced audio signal data pitch-converted in the pitch conversion unit 20.

On the compact disk 11, as shown in FIG. 2, data are recorded in a frame format configuration with each frame consisting of synchronizing signal bits, users' bits, audio data bits and error correction bits, of total 588 bits. In the users' bits, the data indicating the presence or absence of musical sounds, are recorded in the P channel while the data indicating the number of channels, the presence or absence of emphasis, the absolute addresses, tune number, index numbers in the tune, etc. are recorded in the Q channel.

In the player unit 10, while the compact disk 11 is driven in rotation by means of a disk driver 12, the data recorded on the disk 11 are read by a pick-up, not shown, so as to obtain reproduced digital signals $S_{PB}$, which are then processed by a signal processor section 13 for reproducing the synchronizing signal or users' bit data so as to control the driving system and for reproducing and outputting PCM digital signal $S_{PCM}$ on musical sounds. In the player 10 of the present embodiment, the signal processor section 13 produces end signal $S_{END}$ indicating the end of the musical sound on the basis of the P channel data of the users' bits, this end signal $S_{END}$ is supplied to the pitch conversion unit 20 along with the PCM digital signals $S_{PCM}$. The player unit 10 is also provided with a variable oscillator 15 of which the oscillating frequency fo is controlled by speed control signals supplied from a reproducing speed control section 14. The rotation of the disk driver 12 is servocontrolled by a rotation control section 16 in such a manner that the reproduced digital signal $S_{PB}$ is derived in synchronism with the oscillating frequency fo.

The reproducing speed control section, 14 outputs a speed control signal indicating a magnification factor $\alpha$ referenced to the standard reproducing speed, which is supplied to the oscillator 15 such that $\alpha=1$ during standard speed reproduction, $0<\alpha<1$ during low-speed reproduction and $1<\alpha$ during high-speed reproduction.

The oscillator 15 is driven at an oscillating frequency fo such that $$fo = \alpha \cdot Fo \qquad (1)$$

wherein Fo indicates the oscillating frequency for $\alpha=1$, that is, for the standard speed reproduction during which the audio signal data with the aforementioned predetermined sampling frequency Fs is reproduced as it is from the compact disk 11. The rotation control section 16 controls the rotating speed of the compact disk 11 in synchronism with the oscillation frequency fo. The signal processor section 13 also operates to process the signal in synchronism with the oscillating frequency fo.

Thus, in the player unit 10, the PCM digital signals $S_{PCM}$ with the reproducing sampling frequency fs such that $$fs = \alpha \cdot Fs \qquad (2)$$

are outputted from the signal processor section 13 as the reproduced audio signal data. In the equation (2), Fs denotes the reproducing sampling frequency for standard speed reproduction, which is equal to the aforementioned predetermined sampling frequency at which the audio signal data are recorded on the compact disk 11.

The end signal $S_{END}$ as well as the PCM digital signal $S_{PCM}$ which is the reproduced audio signal data from the player unit 10 are supplied to the pitch conversion unit 20 which is comprized of a pitch conversion processor section 21 and a pitch ratio control section 22. The PCM digital signal $S_{PCM}$ undergoes a pitch conversion at the pitch conversion processor section 21 in accordance with the pitch ratio control signal supplied from the pitch ratio control processor section 22.

The pitch conversion is effected at the pitch conversion processor section 21 with the aid of memory means, not shown, in such a manner that the data of the PCM digital signal $S_{PCM}$ are written in the memory means by the write clock signal that is timed to the reproducing sampling frequency fs of the PCM digital signal $S_{PCM}$ supplied from the player unit 10 and the data are read out from the memory means by the read clock signal that is timed to the post-conversion sampling frequency fp.

It should be noted that a pitch ratio control signal which will give a sampling frequency fp such that $$fp = \beta \cdot Fp \qquad (3)$$

is supplied from the pitch ratio control section 22 to the pitch conversion processor section 21, where $\beta$ represents the pitch ratio referenced to the sound pitch of the reproduced audio signals during the aforementioned standard speed reproduction. In the above equation (3), Fp represents the sampling frequency for $\beta=1$, that is, that employed during the standard speed reproduction and equal to the aforementioned predetermined sampling frequency Fs.

In the pitch conversion unit 20 of the present embodiment, the ratio $\gamma$ between the sound pitch of the original signals as the audio signal data recorded on the compact disk 11 and the sound pitch of the reproduced signals as reproduced audio signal data converted in the sound pitch, is given by $$\gamma = fp/Fp \qquad (4).$$

Since Fs=Fp, the following equation $$\gamma = \frac{fp}{Fs} = \frac{\beta Fp}{Fs} = \beta \qquad (5)$$

is derived from the equations (3) and (4). Thus the sound pitch of the reproduced signals is not influenced by the reproducing speed employed in the player unit 10 but may be determined solely by the pitch ratio $\beta$. It should be noted that the actual ratio $\delta$ in the pitch conversion employed at the pitch conversion processor section 21 is given by $$\delta = \frac{fp}{fs} = \frac{\beta Fp}{\alpha Fs} = \frac{\beta}{\alpha}. \qquad (6)$$

Thus, the pitch conversion is effected in the pitch conversion processor section 21 by a factor of $1/\alpha$ even when $\beta=1$ and the output from the pitch conversion unit 20 is the conversion output for $\beta=1$.

The pitch-converted PCM digital signal are converted at the D/A converter 30 into an analog form and the resulting analog signals are outputted at a signal output terminal 40 as reproduced audio signals with the reproducing speed or tempo as set with $\alpha$ and the sound pitch or key as set with $\beta$.

The tempo and the sound pitch of the reproduced audio signal obtained at the output terminal 40 can be controlled by the factors $\alpha$ and $\beta$ independently of each other. In addition, any jitter components in the time base occasionally included in the reproduced PCM digital data obtained in the player unit 10 can be automatically compensated in the pitch conversion unit 20.

In the present embodiment, the pitch ratio $\beta$ afforded in the pitch ratio control section 22 can be set arbitrarily and, it is set prior to actual performance. The pitch ratio control section 22 is adapted to be reset to the state of $\beta=1$, that is, to the normal pitch for the standard speed reproduction, whenever the end signal $S_{END}$ is supplied from the player unit 10.

The pitch conversion unit 20 of the present embodiment is concretely constructed, for example, as the block circuit diagram shown in FIG. 3.

In the concrete example shown in FIG. 3, it is assumed that the PCM digital signal $S_{PCM}$ outputted from the player unit 10 is made up of the PCM serial data, bit clock and word clock, and these signals are supplied to the serial to parallel or S/P converter 201 from the first to third signal input terminals 21a, 21b, 21c of the pitch conversion processor section 21.

The end signal $S_{END}$ from the player unit 10 is supplied to a reset terminal of an up/down counter 223 of the pitch ratio control section 22 via a fourth signal input terminal 22d.

In the present embodiment, the pitch ratio control section 22 is provided with a preset counter 221 adapted for counting the clock pulses generated by the clock generator 220, and is adapted for supplying the output count pulses from the preset counter 221 to a readout address counter 208 of the pitch conversion processor section 21. The output count pulses of the preset counter 221 are returned to its load terminal, in such a manner that the data given by a read only memory (ROM) 222 is preset each time an output count pulse is produced.

In the ROM 222, the data corresponding to the aforementioned pitch ratio $\beta$ is written in advance and the data may be read therefrom with the output count data of the up/down counter 223 as address data. The up/down counter 223 is adapted to count up one whenever a first switch 224 connected to its count-up terminal is closed and to count down by one whenever a second switch 225 connected to its count-down terminal is closed.

The preset counter 221 is so designed that the frequency fp of the output count pulses is changed in accordance the preset data thereof and that, when the output count data of the up/down counter 223 are all logical zero, the data read out from the ROM 222 are preset so that the output count pulses are outputted with the frequency fp corresponding to $\beta=1$.

Thus the up/down counter 223 is reset by the aforementioned end signal $S_{END}$ so that the output count pulses from the preset counter 221 are automatically set at the frequency fp corresponding to the state of $\beta=1$.

In the present embodiment, PCM serial data are introduced into the S/P converter 201 of the pitch conversion processor section 21 in synchronism with the bit clock and are latched at the rising edge of the word clock, in such a manner that the aforementioned PCM serial data are converted into word-unit PCM parallel data. The PCM parallel data obtained at the S/P converter 201 are divided into the right channel data and left channel data so as to be written in left-channel and right-channel random access memory RAMs 202, 203, respectively.

The RAMs 202, 203 are adapted for effecting the above described pitch conversion and are designed for writing and reading the data under the control of a RAM controller 209. The respective PCM parallel data read out from these RAMs 202, 203 are supplied to zero-crossing detection circuit 210, as well as to a parallel to serial or P/S converter 206 via cross fading circuits 204, 205, so that the parallel data are reconverted into the PCM serial data at the P/S converter 206 so as to be outputted from the first signal output terminal 21A.

It should be noted that the P/S converter 206 may perform its signal conversion operation under the timing signal supplied from a main controller 200 in such a manner that the PCM serial data are outputted from the first signal output terminal 21A, the bit clock corresponding to the PCM parallel data is outputted from the second signal output terminal 21B and word clock is outputted from the third signal output 21C.

To the RAM controller 209, a write address WA generated at a write address counter 207 adapted for counting the word clock supplied to the third signal input terminal 21C and a read address RA generated at a read address counter 208 adapted for counting the output count pulses of the preset counter 221 of the aforementioned pitch ratio control section 22 are supplied.

It should be noted that the word clock has the aforementioned reproducing sampling frequency fs and that the read-out address counter 208 is constructed as a preset counter whose preset value can be changed under the instructions of the main controller 200.

When not reset by the end signal $S_{END}$ from the player unit 10, the pitch ratio control section 22 may be so designed that, as shown in FIG. 4, a variable oscillator 220' is adapted for oscillating at the aforementioned frequency fp shown in the aforementioned equation (3) and the oscillating frequency fp is changed by pitch ratio controller 221'.

The data write/read operation to and from the RAMs 202, 203 is controlled in the following manner by the RAM . controller 209.

Assumed that the sampling frequency of the reproduced PCM digital signals $S_{PCM}$ introduced into the pitch conversion unit 20 is fs and that the sampling frequency of the output signals supplied from the pitch conversion unit 20 is fp, the input signal is sequentially written into RAMs 202, 203 in accordance with the write clock of the frequency fs, and the output signal is sequentially read out from the RAMs 202, 203 in accordance with the read-out clock of the frequency fp. That is, the waveform of the signal read out at a speed different from that at which it is written into the RAMs 202, 203 is compressed or expanded on the time base so that the pitch conversion ratio becomes fp/fs.

It should be noted that the address space on the RAMs 202, 203 can be visualized as a loop as shown in FIG. 5 by connecting the maximum address to the minimum address, with the write address WA and the read address RA travelling on the loop of the address space at speeds corresponding to fs and fp, respectively. The address difference (WA-RA) between the write address WA and the read address RA corresponds to the delay time $T_D$ of the output signal from the input signal.

Assuming that the pitch conversion ratio fp/fs is larger than unity, or fp>fs, the read address RA travels on the address space on the RAM shown in FIG. 5 at a speed faster than the write address WA. The result is that the address difference (WA-RA) corresponding to the aforementioned signal delay time $T_D$ is decreased with the lapse of time, and becomes minimum (approaches zero) when RA is about to overtake WA on the contrary becomes equal to the total capacity of the RAM when RA has just passed WA. When the maximum delay time corresponding to the total RAM capacity is expressed as $T_{DMAX}$, the delay time $T_D$ of the output signal from the input signal is changed as shown at in FIG. 6-A.

Figure 6:
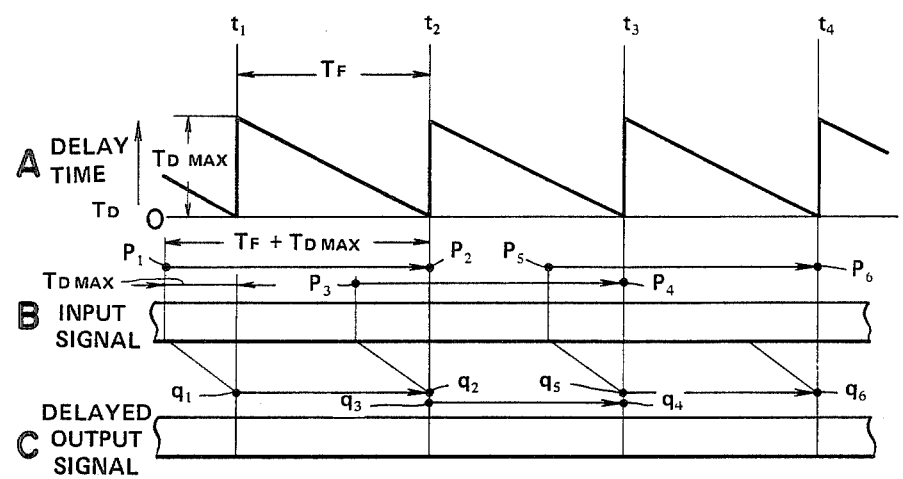
FIG. 6 consisting of a, b and c is a time chart showing the operation of the RAM for effecting the pitch conversion.

Referring to FIG. 6, the read address RA overtakes the write address WA right before time $t_1$ and the delay time $T_D$ is equal to the maximum value $T_{DMAX}$ right after time $t_1$ As RA approaches WA with the lapse of time, the delay time $T_D$ is decreased gradually. At (or right before) time $t_2$, that is, after lapse of the predetermined time $T_F$, RA overtakes WA again so that the delay time $T_D$ becomes minimum (about zero). Thus the input signal (FIG. 6-B) of time interval from the point $p_1$ preceding the time $t_1$ by the above time interval $T_{DMAX}$ to the point $p_2$ at the time $t_2$ is compressed in a time interval $T_F$ so as to give an output signal (FIG. 6-C) of time interval from the point $q_1$ at the time $t_1$ to the point $q_2$ at the time $t_2$. That is, the contents at the point $q_1$ of the delayed output signal shown in FIG. 6-C are those at the point $q_1$ of the input signal shown in FIG. 6-B preceding the time $t_1$ of the input signal by $T_{DMAX}$ because the delay time at this time is equal to $T_{DMAX}$. The delay time becomes less with the lapse of time in such a manner that the delay time becomes zero at (or right before) time $t_2$ which is later by $T_F$ and the contents at the point $p_2$ of the input signal are precisely those at the point $q_2$ of the output signal. At the time $t_2$, the delay time is changed discontinuously from the minimum value 0 to the maximum value $T_{DMAX}$. The contents of the output signal (FIG. 6-C) at the point $q_3$ right after time $t_2$ are precisely those of the input signal (FIG. 6-B) at the point $p_3$ which precedes the time $t_2$ by $T_{DMAX}$. In the similar manner, the contents of the input signal (FIG. 6-B) during the time $(T_F+T_{DMAX})$ from the point $p_3$ to the point $p_4$ become those of the output signal (FIG. 6-C) during the time $T_F$ from the point $q_3$ to the point $q_4$ by time base compression, while the contents of the input signal from the point $p_5$ to the point $p_6$ become those of the output signal from the point $q_5$ to the point $q_6$ et seq, in such a manner that a time base compression is effected by a factor of fp/fs between the input and output signals. At this time, the contents of the output signals (FIG. 6-C) at the times $t_1$, $t_2$, $t_3$,—are discontinuous and, in addition, in the vicinity of those times $t_1$, $t_2$, $t_3$,—, the contents of the input signal (FIG. 6-B) for the respective time intervals $T_{DMAX}$ are repeatedly outputted at the points $p_1$, $p_2$, $p_3$,—.

In the present concrete example, in order to prevent the occurrence of click noises etc. due to the discontinuous or overlapped signal portions, zero-crossing detection is made by a zero-crossing detection circuit 210 through making use of the MSBs of the PCM parallel data read out from the RAMs 202, 203 and the zero crossing detection output signal is supplied to the main controller 200. The preset values of the read-out address counter 208 are changed on the basis of the detecting output signal so that the waveform of the reproduced analog audio signals becomes continuous at the zero-crossing points as shown in FIGS. 7 or 8. If the zero-crossing detection is done for the low-frequency components of the original signal, more desirable reproduced waveforms are achieved on the sense of hearing. The main controller 200 is adapted to determine the cross-fade timing on the basis of the zero-crossing detection output and to activate the cross-fading circuits 204, 205 by means of a cross-fading controller 211.

FIG. 7 shows the operation for the case $\alpha>1$, $\beta=1$ in the present embodiment. When the original signal waveform as shown in FIG. 7-A is fast reproduced with a magnetification factor $\alpha$ in the player unit 10, the reproduced analog waveform corresponding to the PCM digital signal derived from the player unit 10 undergoes a time base compression as shown in FIG. 7-B. The pitch conversion unit 20 performs a pitch conversion of the PCM digital data with a pitch ratio $\beta$ for forming a reproduced PCM digital data corresponding to the reproduced analog signal having the same sound pitch as that of the original signal waveform as shown in FIG. 7-C. In the present pitch conversion unit 20, the PCM digital data are partially omitted by changing the preset value of the readout address counter 208 according to the zero-crossing detection so as to assure the continuity of the reproduced analog signal waveform. Similarly, the operation for the cases $0<\alpha<1$ and $\beta=1$ is shown in FIGS. 8A, 8B, and 8C.

In the above embodiment, the end signal $S_{END}$ is generated at the player unit 10 on the basis of the P-channel data of the users' bits and the up/down counter 223 of the pitch ratio control section 22 is reset by the end signal $S_{END}$. However, the end signal $S_{END}$ may also be generated from the Q-channel data of the users' bits. In the existing compact disk player, users' bits can be taken out at the accessory port. Since the data indicating the tune number is also included in the Q-channel data, the data can be used for automatically setting the pitch ratio $\beta$ in dependence upon the tune reproduced by the player unit 10, in case that a RAM be provided in the pitch ratio control section 22 and the data as a function of the tune to be reproduced be previously written in the RAM so as to read out the preset data corresponding to the arbitrary pitch ratio $\beta$ from the ROM 222.

Although the present invention is applied to the compact disk player in the above described embodiment, the present invention is not limited to the above embodiment and can also be applied to the analog player or to the reproducing systems for other digital audio signals such as digital audio tape recorders. In the case of the analog player, the pitch ratio can be automatically set by the music interval signal obtained by the music interval detection of the reproduced audio signal.

From the foregoing it is seen that the present invention provides an apparatus for reproducing audio signal in which desired pitch conversion can be effected at the pitch conversion unit without requiring information indicating the ratio of change of the reproducing speed at the player unit, and in which variable independent control of the pitch and reproducing speed of the reproduced audio signal can be made so as to be suitably used in connection with the reproduction of a performance of the background orchestra without the singer's voice.

Also the apparatus for reproducing audio signal suitable for the reproduction of a performance of the background orchestra without the singer's voice is provided according to the present invention because the preset pitch ratio can be automatically set for each tune of the reproduced signal for improving the operability of the apparatus.

What is claimed is:

1. An apparatus for reproducing an audio signal comprisng a reproducing unit wherein audio signal data are reproduced at a variable $\alpha$-times speed from a medium on which said audio signal data was previously recorded at a predetermined sampling frequency Fs, and a pitch conversion unit wherein pitch conversion of the reproduced audio signal is effected such that said audio signal data at a sampling frequency fs ($=\alpha$Fs) obtained from said reproducing unit are written into a memory with a write clock corresponding to said reproducing sampling frequency fs and read out from said memory with a read clock corresponding to a frequency fp which is $\beta$ times said predetermined sampling frequency Fs, where $\beta$ is a selected multiplier.

2. An apparatus for reproducing an audio signal comprising a reproducing unit wherein said digital audio signal data are reproduced at a variable $\alpha$-time speed from a recording medium on which an analog audio signal was previously pulse code modulated at a predetermined sampling frequency Fs and recorded in the form of digital audio signal data; a pitch conversion unit for effecting a pitch conversion such that said digital audio signal data of the sampling frequency fs ($=\alpha$Fs) obtained from said reproducing unit are written into a memory with a write clock generated from said digital audio signal data and are read out from said memory with a read-out clock corresponding to a frequency fp which is $\beta$ times said predetermined sampling frequency Fs, where $\beta$ is a selected variable; and a digital to analog converter for effecting a digital to analog conversion of the pitch-converted digital audio signal data for obtaining a reproduced analog audio signal.

3. An apparatus for reproducing an audio signal comprising a reproducing unit wherein audio signal data are reproduced at a variable $\alpha$-time speed from a medium on which said audio signal data are previously recorded at a predetermined sampling frequency Fs, and a pitch conversion unit wherein a pitch conversion is effected in such a manner that said audio signal data of the sampling frequency fs ($=\alpha$Fs) obtained from said reproducing unit are written into a memory with a write clock corresponding to said reproducing sampling frequency fs and are read-out from said memory with a read-out clock corresponding to an oscillating frequency fp ($=\alpha$Fs) of a variable oscillator oscillating with a frequency which is $\beta$ times said predetermined sampling frequency Fs, where $\beta$ is a selected variable; and wherein the pitch conversion of the reproduced audio signal corresponding to the frequency ratio fp:Fp is effected independently of the reproducing speed at said reproducing unit.

4. The apparatus according to claim 3 characterized in that said variable oscillator is constituted by a digital oscillator.

5. An apparatus for reproducing audio signal comprising a pitch conversion processing section for effecting a pitch conversion of a reproduced audio signal at a desired pitch conversion ratio, and a pitch ratio control section for automatically setting said pitch conversion ratio of said pitch conversion processing section to a preset value on the basis of a signal indicating the starting or end of said reproduced audio signal.

6. An apparatus for reproducing an audio signal including cross-fade circuit means adapted for switching a first audio signal into a second, timebase adjusted, audio signal so as to derive a continuous signal therefrom, characterized by means for separating low-frequency components of said first and second audio signals, means for detecting zero-crossing points of said first audio signal, means for controlling said cross-fade circuit means in response to said detected zero crossing points so that said first and second audio signals are connected on the time base substantially at the low frequency zero-crossing points of said first audio signal.

* * * * *